United States Patent
Grubb et al.

[15] 3,650,836
[45] Mar. 21, 1972

[54] ELECTROCHEMICAL CELL WITH AT LEAST ONE GAS DIFFUSION ELECTRODE

[72] Inventors: Willard T. Grubb, Schenectady, N.Y.; Robert A. Macur, Milwaukee, Wis.

[73] Assignee: General Electric Company

[22] Filed: Apr. 6, 1970

[21] Appl. No.: 25,703

[52] U.S. Cl. .........................................136/86 R
[51] Int. Cl. ...........................................H01m 27/00
[58] Field of Search ........................136/86, 157, 145

[56] References Cited

UNITED STATES PATENTS

| | | | |
|---|---|---|---|
| 1,541,699 | 6/1925 | Freeth et al. | 136/157 |
| 3,244,564 | 4/1966 | Fox | 136/86 |

Primary Examiner—Winston A. Douglas
Assistant Examiner—H. A. Feeley
Attorney—Richard R. Brainard, Paul A. Frank, Charles T. Watts, Paul R. Webb, Frank L. Neuhauser, Oscar B. Waddell and Joseph B. Forman

[57] ABSTRACT

An electrochemical cell has at least one positive wet-proofed gas diffusion electrode with its major portion within the casing covered with a fuel and oxidant impervious mask, and with its remaining portion within the casing covered with at least one water soluble polymeric thickening agent swellable in the aqueous alkaline electrolyte of a fuel-electrolyte solution and an alkali metal silicate dissolved in the solution. This cell eliminates or reduces substantially the conventional problems of carbonate crust formation, electrolyte leakage, drowning of the gas diffusion electrode, and loss of fuel.

5 Claims, 1 Drawing Figure

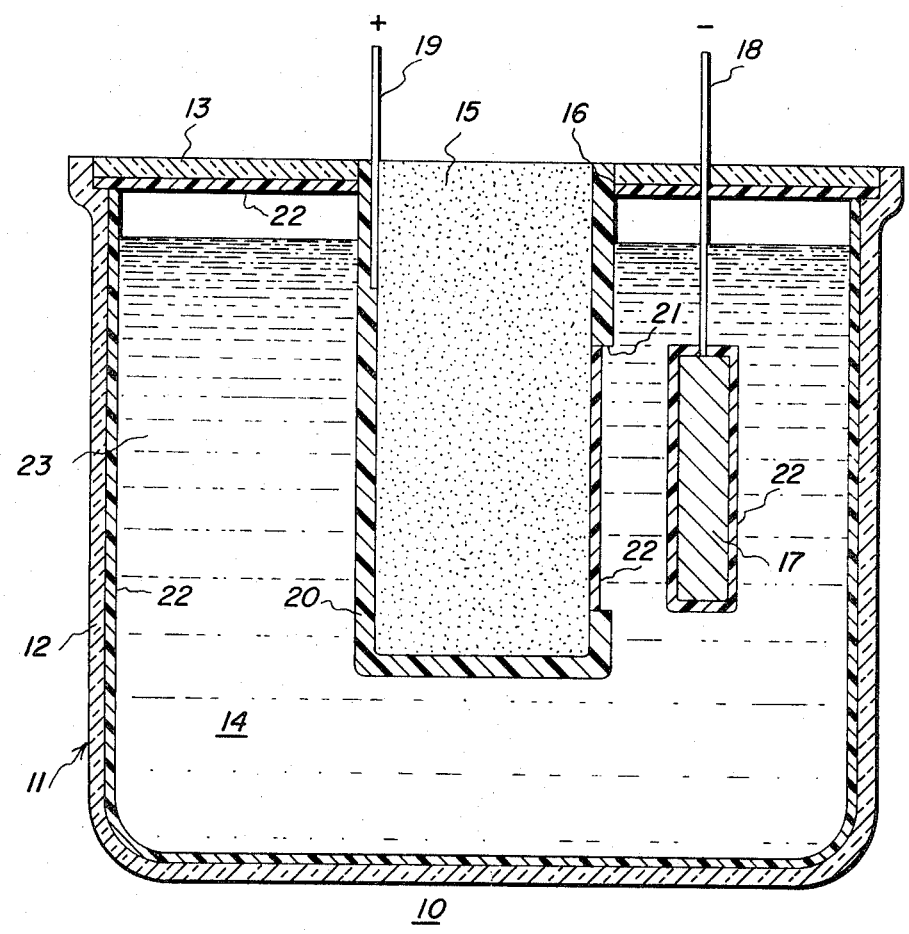

ELECTROCHEMICAL CELL WITH AT LEAST ONE GAS DIFFUSION ELECTRODE

This invention relates to electrochemical cells with at least one gas diffusion electrode and, more particularly, to electrochemical cells with a positive wet-proofed and coated and a fuel-electrolyte solution additive.

An electrochemical cell with at least one gas diffusion electrode when employed as a fuel cell having a solution of an aqueous alkaline electrolyte with a soluble fuel dissolved therein, contains an anode in contact with the electrolyte that is capable of electrocatalytically oxidizing a fuel, such as an alcohol. The cathode is a porous, gas diffusion electrode which forms a barrier between the electrolyte and the oxidant, usually air. The cathode is provided with a surface which is active for the reduction of the oxidant but is catalytically passive to the alcohol or other fuel. In such cells, serious problems are encountered in leakage of the electrolyte from the casing, drowning of the cathode by the electrolyte, and evaporation of the fuel.

The gas diffusion electrode in the above type of cell may act as a wick for the electrolyte. Upon the cell's standing in air for several days, formation of carbonate occurs in the electrolytic solution and carbonate crust may be formed on the exterior surface of the gas diffusion electrode. This crust reduces the cell performance and may lead to physical degradation of the electrode structure. As the carbonate crust forms on the exterior surface of the gas diffusion electrode the wicking action of the electrode does not stop at the physical limits of the electrode but the crust wicks up more solution and expands further the volume of the crust formation. Subsequently, all of the solution from the cell is eventually removed down to the level of the lower end of the electrode by this wicking action.

Attempts have been made to overcome this serious problem of carbonate crust formation by wet-proofing the gas diffusion electrode. When this has been accomplished the electrolyte penetrates only a limited distance into a porous structure. Carbonate crust formation will still occur on the exterior surface of the electrode but to a lesser amount. However, a second problem occurs in that carbonate crust forms in the pores of the structure into which it has penetrated whereupon its expansion causes cracking of the electrode.

In the copending patent application of Willard T. Grubb and Carl E. Cliche, Ser. No. 725,989, filed May 2, 1968 and entitled "Composite Electrode and Electrochemical Cell With At Least One Gas Diffusion Electrode," there is described and claimed a composite article, an electrochemical cell and a method of forming a composite article. The electrochemical cell of this copending application provides for a portion of the gas diffusion electrode to have thereon a layer of at least one water soluble polymeric thickening agent swellable in an aqueous electrolyte. This copending application is assigned to the same assignee as the present application.

In U.S. Pat. No. 3,418,166 issued Dec. 24, 1968, an alkaline storage cell is described which has an alkali metal silicate dissolved in the electrolyte, incorporated in the cadmium or iron negative material, or incorporated in the positive active material to extend the life of the negative active material.

It is a primary object of our invention to provide an improved electrochemical cell which eliminates or substantially reduces carbonate crust formation on the exterior surface of the gas diffusion electrode.

In accordance with one aspect of our invention, an electrochemical cell includes the improvement of a major portion of the positive electrode within the casing being covered with a fuel and oxidant impervious mask, the remaining portion of the positive electrode within the casing forming an interface with the electrolyte, the remaining portion of the positive electrode being covered with at least one water soluble polymeric thickening agent swellable in the aqueous alkaline electrolyte, and an alkali metal silicate dissolved in the fuel-electrolyte solution.

These and various other objects, features, and advantages of the invention will be better understood from the following description taken in connection with the accompanying drawing in which:

The single FIGURE is a vertical, sectional view of a fuel cell embodying our invention.

In the single FIGURE of the invention, there is shown generally at 10 an electrochemical cell with at least one gas diffusion electrode embodying our invention, which cell is shown as a fuel cell. Cell 10 has a casing 11 which comprises a body portion 12 with a closed bottom and an open top and a cover portion 13 which fits tightly over the open top of body portion 12. Casing 11 defines a chamber 14 in which there is provided for the operation of the cell a solution of alkaline electrolyte such as potassium hydroxide and a dissolved fuel such as methanol. An alkali metal silicate such as sodium metasilicate or potassium metasilicate is added to the electrolytic solution. A wet-proofed positive porous gas diffusion electrode or cathode 15 has one end fitted into an aperture 16 in cover 13 of casing 11. In this manner, the upper surface of the cathode is exposed to the oxygen oxidant of the atmosphere exterior of casing 11 while the remaining portion of the cathode extends downwardly into chamber 14.

An anode 17 is positioned close to but spaced from cathode 15 within chamber 14. While various suitable arrangements can be employed to support anode 17, there is shown an electrical lead 18 for such support which lead is affixed to anode 17 and extends upwardly through cover 13 of casing 11. Similarly, a lead 19 is shown in contact with cathode 15 and extends outwardly through cover 13 of casing 11. A fuel and oxidant impervious mask 20 covers or overlies a major portion of porous cathode 15 except for a portion 21 of its surface which faces or is opposed to anode 17. Portion 21 forms an interface with the electrolytic solution. At least one water soluble polymer gelling agent 22 is shown covering portion 21 of cathode 15. The same agent 22 is also shown covering the exterior surface of anode 17, and the interior of both body portion 12 and cover 13 of casing 11.

We found that the combination of wet-proofing, masking, thickening agent and alkali metal silicate resulted in an improved electrochemical cell in which carbonate crust was eliminated or reduced substantially. If a defect forms in the thickening agent layer on the gas diffusion electrode, penetration of the carbonate will normally occur into the pores of the wet-proofed electrode. However, the alkali metal silicate reduces this penetration and prevents any carbonate crust from forming in the pores of the electrode or on the exterior surface of the electrode.

The preferred electrolytic solution of electrolyte and fuel is a mixture which is confined or stored in chamber 14 of an aqueous alkaline electrolyte and an alcohol. As is well understood in the art, the electrolyte may be an aqueous alkali solution of any desired concentration. While the alkali metal hydroxides are the most commonly employed and of the lower cost, it is appreciated that other soluble hydroxides may be employed, such as tetrasubstituted ammonium or phosphonium hydroxides. As used herein the term "alcohol" includes methanol, ethanol, n-propanol, and isopropanol—that is, any alcohol having from 1 to 3 carbon atoms. Methanol is a preferred alcohol on the basis of cost and reactivity. Since the alcohols are miscible with water in all proportions, any desired quantity may be utilized. It is preferred, however, that the relation of hydroxyl ions to alcohol be maintained in a molar ratio that insures that all the alcohol will be consumed during extended operation of the unit. Other fuels are also suitable such as hydrazine, formate, ammonia, ethylene glycol, etc. If desired, a large storage chamber for the electrolyte and fuel can be provided by enlarging chamber 14 beneath the electrodes. In this manner, the alcohol capacity of the cell is increased without in any way penalizing performance of the cell. The alkali metal silicate, which is added to the fuel-electrolyte solution is preferably sodium metasilicate or potassium metasilicate.

The anode electrode is schematically illustrated in the drawing. It may be of any conventional construction or configuration. Anodes capable of efficiently oxidizing alcohol usually include platinum metals or alloys as the electrocatalysts. Alloys of noble metals have been found to be most efficient. The electrocatalyst may be employed as a high area coating on a substrate, suitably bonded into a porous mass or supported on a porous substrate of nickel, carbon, etc.

The porous cathode electrode is formed of a porous electronically conductive mass which, at least at the point where the conductive mass forms an interface with the electrolyte, includes an electrocatalytically active material. The electrocatalyst is catalytically inactive toward the oxidation of alcohol. A preferred suitable material meeting all of the above criteria is a porous carbon mass. This material is recognized to selectively catalyze the reduction of oxygen while remaining passive toward alcohol. Other catalysts are, of course, known which are selective to the reduction of oxygen. Silver and silver-nickel alloys are such materials. In the preferred form wet-proofing material is distributed throughout the conductive mass of the cathode.

A major portion of the cathode is covered with a mask. The mask may be formed of any material which is impervious to oxidant as well as fuel and electrolyte. In the configuration shown in the single FIGURE of the drawing, the function of the mask is to avoid contact of oxidant with fuel and electrolyte on the surface of the conductive mass, except at the intended electrolyte interface. Specific examples of masking materials include impervious metal coatings as well as coatings of alkali and methanol impervious nonmetals, such as waxes, rubbers, and resins. The mask is preferably applied in the form of a coating. Wax has been found to be an easily applied, low cost masking material of suitable stability. Cathodes of the above configuration which are both masked and wet-proofed perform better in our invention than corresponding electrodes lacking either masking, wet-proofing, or both. Masking of the above type of cathode is undertaken to slow alcohol evaporation from a cell, as will be more fully explained below.

To replenish the oxygen consumed at the cathode-electrolyte interface, air must diffuse through the porous, electronically conductive cathode. In the configuration shown in the single FIGURE of the drawing, impervious mask 20 is provided to limit the interface of the electrolyte and porous conductive mass to the portion 21 facing the anode electrode. Thus, alcohol diffusing from the restricted interface to the upper end of the porous cathodes is provided with a relatively long diffusion path. The rate of loss of alcohol from the cell over long time periods is thus significantly curtailed.

The exposed or unmasked portion 21 of cathode 16 is impregnated and covered with at least one water soluble polymeric thickening agent swellable in the aqueous alkaline electrolyte of the electrolytic solution. Additionally, if desired at least a portion of the interior surfaces of both the body portion and the cover of the cell casing can be covered with a layer of the thickening agent. Similarly, a layer of the thickening agent can be applied to at least a portion of one of the surfaces of the anode electrode. The water soluble polymeric thickening agent is mixed initially with a solvent such as water and stirred, if desired, to form a mucilage or a viscous solution. This solution is then applied in any suitable manner to the exposed portion of the cathode electrode, to the anode electrode, and to the interior of both the body portion and to the cover of the cell casing. Subsequently, the water solvent is allowed to evaporate from the solution thereby forming a layer of a thickening agent impregnated into, if the structure is porous, and covering the portion of the contacted structure.

The polymeric thickening agent must be water soluble and swellable in an aqueous electrolyte, but not mobile in the same electrolyte. The thickening agent must adhere to and cover the portion of the substrate on which it is applied as a layer or film.

Suitable thickening agents which have the above properties and can be employed in the practice of this invention and are swellable in an aqueous alkaline electrolyte include the polymers of acrylic acid, carboxy polymethylene, carboxymethyl cellulose, methyl cellulose, algin, polyethylene oxide, polyvinyl alcohol, and mixtures thereof. Suitable thickening agents which can be employed in the practice of our invention and are swellable in an aqueous acid electrolyte include the polymers of acrylic acid, carboxy polymethylene, algin, pectin, polyvinyl alcohol, carboxymethyl cellulose, and mixtures thereof.

The alkali metal silicates can add to the fuel-electrolyte solution in various proportion with the unexpected beneficial results of preventing carbonate crust formation and eliminating any wicking action through the formed moist residue. Of the alkali metal silicates we prefer to use sodium metasilicate or potassium metasilicate.

In an illustrative operation of the cell shown in the single FIGURE of the drawing, portion 21 of cathode 15, had applied thereto a thickening agent formed by mixing together at least one water soluble polymeric thickening agent swellable in an aqueous electrolyte and a water solvent. Previously cathode 15 had been wet proofed and covered over a major portion with an impervious mask. After the above portions of the cell have dried, an electrolyte of potassium hydroxide and methyl alcohol forming an electrolytic solution is poured into chamber 14 of casing 11. Generally, this solution is added to a level beneath the open top of body portion 13. Potassium metasilicate is added to the fuel-electrolyte solution. Cover 13 is fitted functionally at the upper open end of body portion 12. Anode 17, and the interior surfaces of body portion 12 and cover portion 13 of casing 11 had applied thereto the same thickening agent. The thickening agent swells in the electrolyte immobilizing substantially the electrolyte and dissolved fuel. Leads 18 and 19 are connected to a suitable electrical load (not shown) and electrical energy is generated from the cell. When the fuel in the form of the methyl alcohol has become sufficiently depleted, cover 13 can be removed, the thickening solution in chamber 14 removed, and additional potassium hydroxide, methyl alcohol, and potassium metasilicate added to chamber 14. The cell can be recovered and operated.

An example of an electrochemical cell, which was not made in accordance with our invention, is set forth below in Example I while an example of an electrochemical cell, which was made in accordance with our invention, is set forth below in Example II.

EXAMPLE I

A porous carbon block with dimensions of ½ × ½ × 1 ½ inch was wet-proofed with 9 weight percent of polyethylene. The block was incorporated into an electrochemical cell structure as in the single FIGURE of the drawing. The cell was filled with an aqueous 6 molar methanol, 13 normal potassium hydroxide solution. The cell was placed on a resistive load. After 600 hours the cell showed carbonate crust formation on the air-exposed surface of its cathode. After 1,400 hours, the cell showed massive carbonate crust formation and was producing only 15 percent of its initial voltage under load.

EXAMPLE II

A porous carbon block as in Example I was drilled out with a ⅜ inch diameter drill to within about ⅛ inch of one end forming a long cup shaped piece. This was wet-proofed with 10.6 weight percent polyethylene. After wet-proofing, the outer surface of the porous carbon was masked with a mask impervious to fuel, electrolyte and oxygen except for an area 1 inch × ½ inch later to face the anode in the structure shown in the single FIGURE of the drawing. The unmasked surface was coated with a layer of gel by applying two successive coats of a mucilage prepared by dissolving 2.5 percent of a carboxylated polymethylene polymer in water. The layer was dried between coats and after the second coat. This cathode was incorporated into an electrochemical cell structure similar to the single FIGURE of the drawing and placed on resistive load.

After 600 hours this cell showed no crust formation and there had been no leakage of electrolyte into the cup-shaped cathode. It was delivering 97 percent of its initial voltage under load. After 1,500 hours, there was no crust formation and the cell was producing 56 percent of its initial voltage under load.

While other modifications of the invention and variations thereof which may be employed within the scope of the invention have not been described, the invention is intended to include such as may be embraced within the following claims:

What we claim as new and desire to secure by Letters Patent of the United States is:

1. In an electrochemical cell comprising a casing, at least one negative electrode positioned in the casing, at least one positive gas diffusion electrode being uniformly impregnated with a wet-proofing material positioned in the casing and spaced from the negative electrode, one portion of the positive electrode being exposed to oxygen oxidant exterior of the casing, a solution of an aqueous alkaline electrolyte with alcohol as the fuel dissolved therein within the casing and in contact with the electrodes, the improvement comprising a major portion of the positive electrode within the casing being covered with a fuel and oxidant impervious mask, and the remaining portion of the positive electrode within the casing forming an interface with the electrolyte, the remaining portion of the positive electrode being covered with at least one water soluble polymeric thickening agent swellable in the aqueous alkaline electrolyte, and an alkali metal silicate in the fuel-electrolyte solution thereby reducing alkali carbonate crust formation on the exterior surface of the gas diffusion electrode.

2. In an electrochemical cell as in claim 1, wherein the alkali metal silicate is potassium metasilicate.

3. In an electrochemical cell as in claim 1 wherein the alkali metal silicate is sodium metasilicate.

4. In an electrochemical cell as in claim 1, wherein the gas diffusion electrode is porous carbon, the thickening agent is a carboxy polymethylene polymer, the electrolyte is potassium hydroxide, the fuel is methanol, and the alkali metal silicate is potassium metasilicate.

5. In an electrochemical cell as in claim 1, wherein the gas diffusion electrode is porous carbon, the thickening agent is carboxy polymethylene polymer, the electrolyte is sodium hydroxide, the fuel is methanol, and the alkali metal silicate is sodium metasilicate.

* * * * *